United States Patent
Gaunt et al.

(10) Patent No.: US 12,146,519 B2
(45) Date of Patent: Nov. 19, 2024

(54) FASTENING DEVICE WITH EMBEDMENT

(71) Applicant: GM GLOBAL TECHNOLOGY OPERATIONS LLC, Detroit, MI (US)

(72) Inventors: Michael C. Gaunt, Metamora, MI (US); Christopher J. Mielke, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 455 days.

(21) Appl. No.: 17/689,195

(22) Filed: Mar. 8, 2022

(65) Prior Publication Data

US 2023/0287924 A1 Sep. 14, 2023

(51) Int. Cl.
*F16B 37/04* (2006.01)
*F16B 19/10* (2006.01)

(52) U.S. Cl.
CPC ........ *F16B 37/048* (2013.01); *F16B 19/1054* (2013.01); *F16B 37/04* (2013.01)

(58) Field of Classification Search
CPC ...... F16B 19/10; F16B 19/1054; F16B 37/00; F16B 37/04; F16B 37/041; F16B 37/044–045; F16B 37/048; F16B 37/06
USPC ................. 411/172–174, 176–179, 180, 427
See application file for complete search history.

(56) References Cited

U.S. PATENT DOCUMENTS

| | | | | |
|---|---|---|---|---|
| 3,000,420 A * | 9/1961 | Spokes | ................. | F16B 37/068 29/520 |
| 3,461,936 A * | 8/1969 | Jose, Sr. | ............... | F16B 37/068 29/523 |
| 7,878,746 B2 * | 2/2011 | Babej | .................... | B23P 19/062 411/188 |
| 8,096,743 B2 * | 1/2012 | Babej | .................... | F16B 37/068 411/188 |
| 8,328,485 B2 * | 12/2012 | Babej | ...................... | F16B 39/00 411/181 |
| 8,366,364 B2 * | 2/2013 | Maloney | ............... | F16B 37/068 411/176 |
| 2010/0129173 A1 * | 5/2010 | Babej | .................... | F16B 37/065 411/173 |

* cited by examiner

*Primary Examiner* — Roberta S Delisle

(57) ABSTRACT

A fastener for attaching a first part and a second part includes a body comprising a first body portion, a second body portion, a flange arranged between the first body portion and the second body portion and extending radially outwardly from the body. A bore extends in an axial direction through the body and including an inner surface with threads. A plurality of splines extend radially outwardly from the second body portion and is configured to prevent rotation when the second body portion is inserted into an opening in the first part. An opening to the bore at the second body portion defines a concentric edge and an inclined plane extending from the concentric edge.

16 Claims, 3 Drawing Sheets

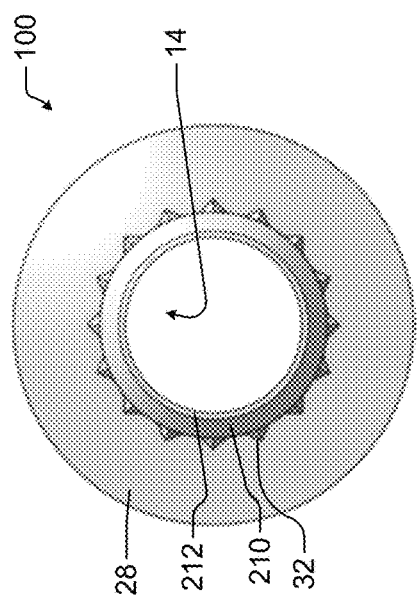
FIG. 11
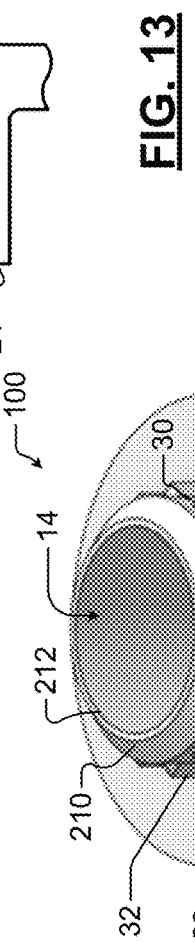
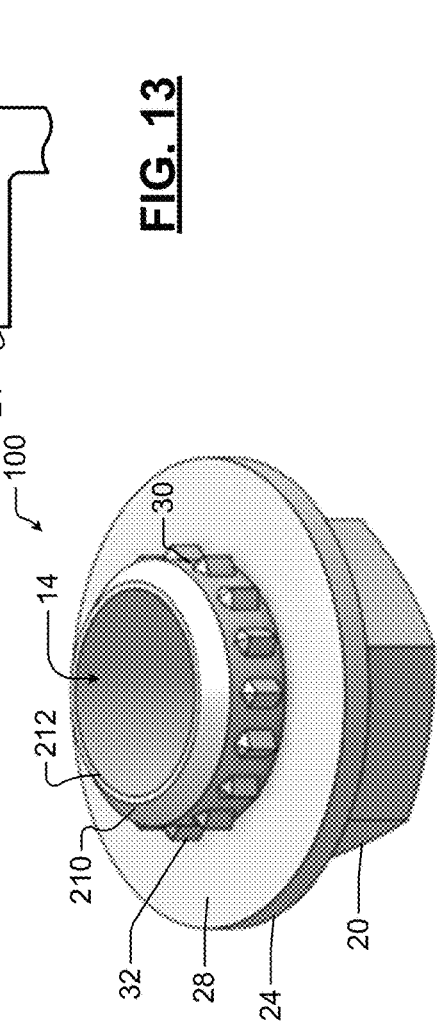
FIG. 13
FIG. 12
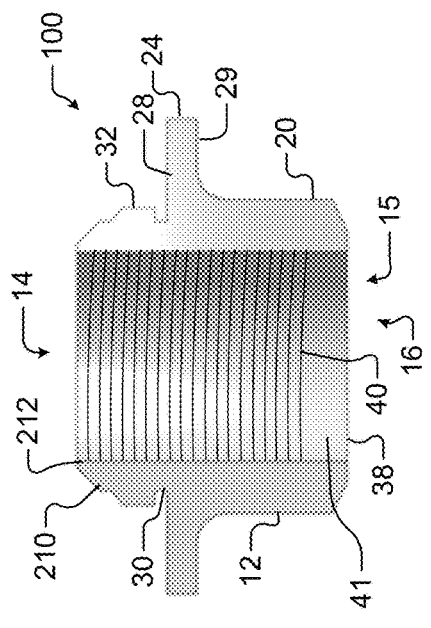
FIG. 9
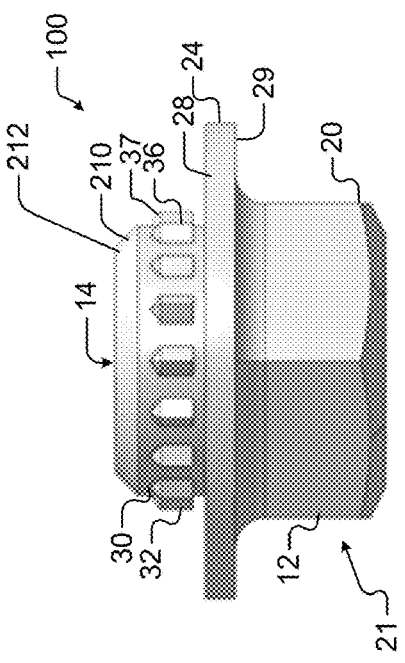
FIG. 10

FASTENING DEVICE WITH EMBEDMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to fasteners, and more particularly to blind fasteners.

Fasteners may be used to connect two parts together. In some applications, the backside of one of the two parts is inaccessible. This arrangement makes it difficult to position and hold a loose nut during tightening of a bolt to fasten the first and second parts together. When one or both of the parts have a low coefficient of friction, it may be difficult for the fastener to resist shear forces. The fastener may be unable to create high enough clamp force to prevent loosening of the joint.

SUMMARY

A fastener for attaching a first part and a second part includes a body comprising a first body portion, a second body portion, and a flange arranged between the first body portion and the second body portion and extending radially outwardly from the body. A bore extends in an axial direction through the body and includes an inner surface with threads. A plurality of splines extend radially outwardly from the second body portion and are configured to prevent rotation when the second body portion is inserted into an opening in the first part.

In other features, an opening into the bore at the second body portion includes a concentric edge and an inclined plane extending from the concentric edge. The concentric edge and the inclined plane are configured to embed into the second part and prevent lateral slipping of the fastener relative to the second part. The concentric edge and the inclined plane define a concave surface. The concentric edge includes a plurality of notches that are spaced apart. The notches have a depth in a range from 0.25 mm to 1 mm.

In other features, the concentric edge and the inclined plane define a convex surface. The concentric edge includes a plurality of notches that are spaced apart. The notches have a depth in a range from 0.25 mm to 1 mm. A tool engaging surface is defined on a radially outer surface of the first body portion for engaging a tool. The plurality of splines have a triangular cylinder shape. The plurality of splines includes a pointed end on one side of the triangular cylinder shape. The concentric edge is configured to embed into the second part in a range from 0.25 mm to 1 mm.

A fastener for attaching a first part and a second part includes a body comprising a first body portion, a second body portion, and a flange arranged between the first body portion and the second body portion and extending radially outwardly from the body. A bore extends in an axial direction through the body and including an inner surface with threads. A plurality of splines extend radially outwardly from the second body portion and is configured to prevent rotation when the second body portion is inserted into an opening in the first part. An opening to the bore at the second body portion defines a concentric edge and an inclined plane extending from the concentric edge. The concentric edge is configured to embed into the second part.

In other features, the concentric edge is configured to embed into the second part in a range from 0.25 mm to 1 mm. The concentric edge includes a plurality of notches that are spaced apart. The notches have a depth in a range from 0.25 mm to 1 mm. A tool engaging surface is defined on a radially outer surface of the first body portion for engaging a tool. The plurality of splines have a triangular cylinder shape. The plurality of splines include a pointed end on one side of the triangular cylinder shape.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 9 is a side cross-sectional view of another example of a fastener according to the present disclosure;

FIG. 10 is a side view of another example of a fastener according to the present disclosure;

FIG. 11 is a bottom view of another example of a fastener according to the present disclosure;

FIG. 12 is a bottom perspective view of another example of a fastener according to the present disclosure; and FIG. 13 is a side view of a portion of an example of a fastener including concave and convex surfaces according to the present disclosure.

In the drawings, reference numbers may be reused to identify similar and/or identical elements.

DETAILED DESCRIPTION

A fastener according to the present disclosure is used to attach a first part such as a mounting plate or bracket to a second part such as a frame or crossmember, although other types of parts can be fastened together. The fastener includes a body defining an axial bore including threads formed on an inner surface thereof. The body includes a first body portion, a second body portion and a flange arranged between the first body portion and the second body portion.

The first body portion optionally includes a tool engaging surface such as a hexagonal head. The second body portion includes a plurality of splines that are circumferentially spaced apart and extend radially outwardly therefrom. The second body portion is inserted or pressed into a first opening in the first part and the splines engage the first opening in the first part to prevent rotation of the fastener during tightening of the bolt. The splines also prevent the fastener from getting pushed out of the first part by allowing the part material to flow around the back of the splines and therefore lock the fastener and the first part together when the fastener is pressed into the first part.

The second body portion also includes a concentric edge and an inclined plane forming either a concave or convex opening. During tightening, the concentric edge embeds a predetermined distance into the second part to prevent lateral slipping.

As can be appreciated, the fastener provides high clamping force and high shear force. The fastener can be installed in blind applications where access to hold the fastener using a tool during tightening is not possible.

Figure 1:
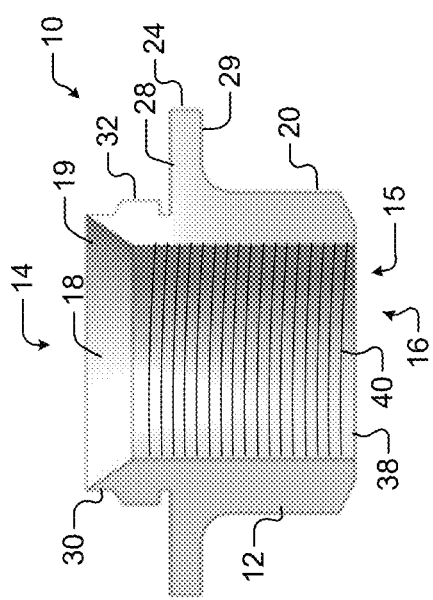
FIG. 1 is a side cross-sectional view of an example of a fastener according to the present disclosure.
Figure 2:
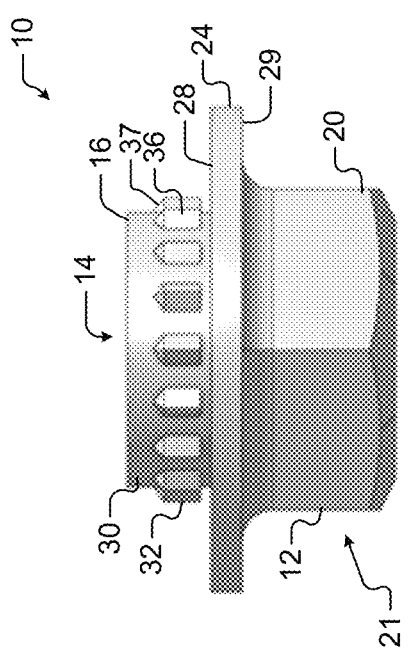
FIG. 2 is a side view of an example of a fastener according to the present disclosure.

Referring now to FIGS. 1 and 2, a fastener 10 according to the present disclosure includes a body 12 defining a central bore 16 extending in an axial direction and including openings 14, 15 located on opposite sides of the central bore 16. An inclined plane 18 extends inwardly from a concentric edge 19 of the body 12 (forming a concave surface) adjacent to the opening 14 to provide a surface that embeds into the second part to prevent lateral slipping.

The body 12 includes a first body portion 20, a flange 24 and a second body portion 30. In some examples, the first body portion 20 defines a tool engaging surface 21 for allowing engagement of a wrench, socket or other tool during tightening. While the hexagonal shaped head is disclosed, other types of tool engaging surfaces 21 may be used such as square or polygonal surfaces, splined surfaces, a male torx surfaces, etc. In other examples, the first body portion 20 can be round or cylindrical. The tool engaging surface 21 may or may not be needed during assembly of the fastener to the bracket/part or in cases where the torque to install or remove the bolt is excessively high (for example due to heavy corrosion).

The first body portion 20 arranged nearest the opening 14 receives the bolt. The flange 24 extends radially outwardly from the body 12 between the first body portion 20 and the second body portion 30. The flange 24 includes a surface 28 and a second surface 29. In some examples, the surface 28 acts as a stop against one of the parts being fastened together by the fastener 10. In some examples including a tool engaging surface, the second surface 29 acts as a stop for a tool such as a wrench.

The second body portion 30 includes a plurality of splines 32 extending radially outwardly therefrom. In FIG. 2, the splines 32 are shown located in a spaced relationship around a radially outer circumference of the second body portion 30. In some examples, the splines 32 have a triangular cylinder shape 36 with an inclined and pointed end 37, although the splines 32 may have other shapes. The splines 32 can either stop before reaching the surface 28 of the flange 24 (as shown) and the concentric edge 19. In other examples, one or more of the splines 32 can extend to the surface 28 (not shown). In other examples, one or more of the splines 32 can extend to the concentric edge 19 (not shown).

Figure 7:
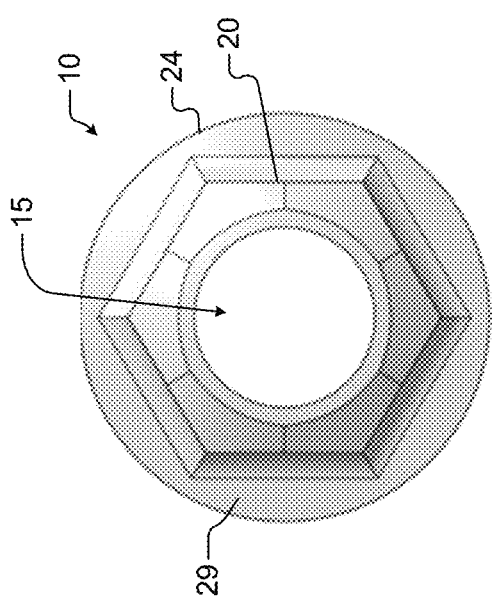
FIG. 7 is side cross-sectional view of a bolt connecting first and second parts together using the fastener according to the present disclosure.

An inner surface 38 of the central bore 16 includes threads 40 configured to engage with threads of a bolt (as shown in FIG. 7). In some examples, the threads 40 are formed along the entire axial bore. In other examples, the threads 40 extend along a portion of the axial bore and counterbore(s) 41 (FIG. 9) are used adjacent to one or both openings.

In the example shown, the second body portion 30 is cylindrical. In other examples, the second body portion 30 can have other shapes such as a polygon or irregular shape. In some examples, the shape and size of the second body portion 30 matches an opening in the first part to provide a lead-in during the press operation to align the fastener with the part and control the flow of material of the part around the splines.

Figure 3:
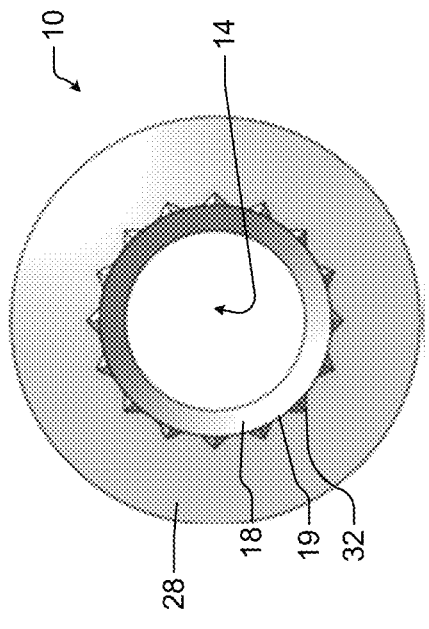
FIG. 3 is a bottom view of an example of a fastener according to the present disclosure.
Figure 4:
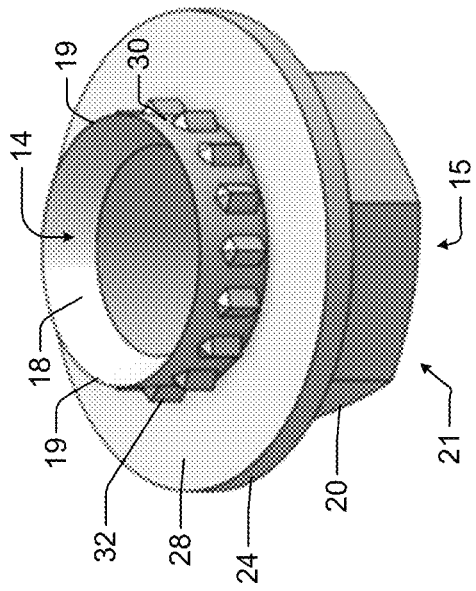
FIG. 4 is a bottom perspective view of an example of a fastener according to the present disclosure.

Referring now to FIGS. 3 and 4, the bolt-receiving side of the fastener 10 is shown. The plurality of splines 32, the inclined plane 18 and the concentric edge 19 can be seen in further detail. When the fastener 10 is inserted, the plurality of splines 32 engage circumferential sides of the first opening formed in the first part to prevent rotation of the fastener 10 as the bolt is tightened. This allows the fastener 10 to be used for blind applications that do not allow access to hold the fastener 10 during tightening. As the bolt is initially tightened, the concentric edge 19 embeds into the second part to create high shear force and prevent lateral slipping. Then, further tightening increases clamping force on the first and second parts.

Figure 6:
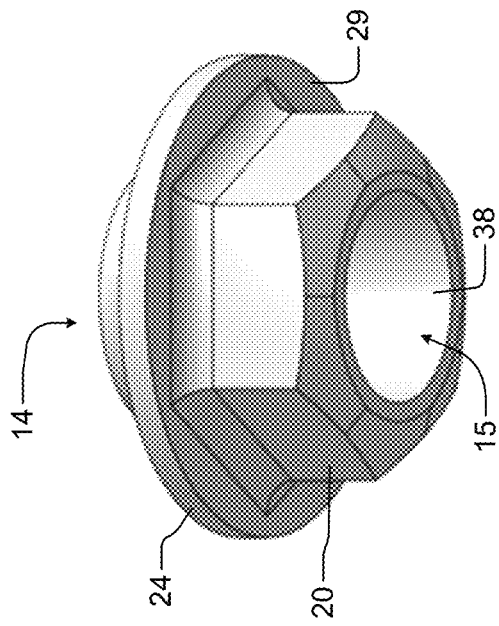
FIG. 6 is a top perspective view of an example of a fastener according to the present disclosure.
Figure 5:
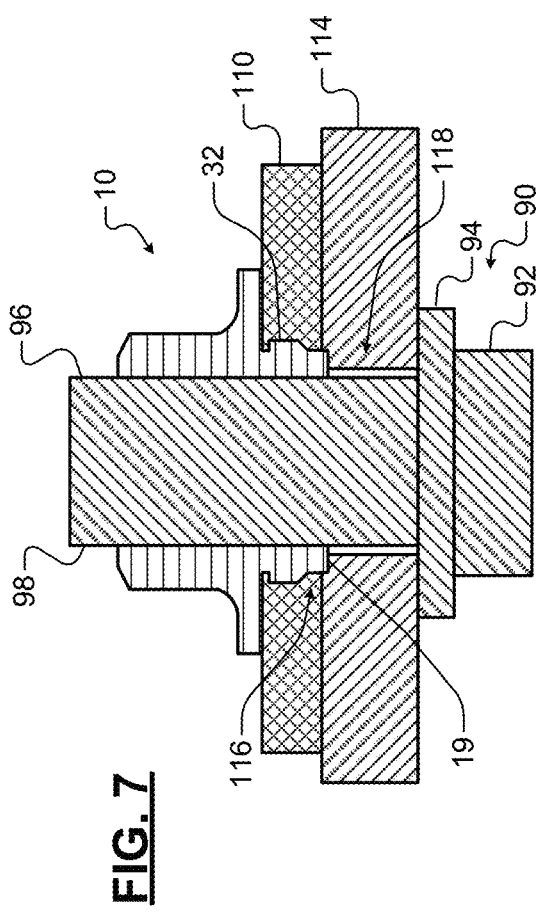
FIG. 5 is a top view of an example of a fastener according to the present disclosure.

Referring now to FIGS. 5 and 6, the other side of the fastener 10 is shown. The first body portion 20 may define the tool engaging surface 21 for engaging with a wrench, socket or other tool. In FIG. 6, as the bolt is tightened, the threads of the bolt engage the threads 40 and an end of the bolt may or may not pass through the opening 15. As can be appreciated, the threads 40 on the inner surface 38 are not shown in FIG. 6.

Referring now to FIG. 7, a bolt 90 includes a head 92, a flange 94, and a shaft 96 including threads 98. The bolt 90 and the fastener 10 connect a first part 110 and a second part 114 together. During assembly of the first part 110 to the second part 114, openings 116, 118 in the first part 110 and the second part 114, respectively, are machined, punched, laser cut, and/or drilled. In some examples, an opening 116 in the first part 110 is slightly larger than the diameter of the second body portion 30. An opening 118 in the second part 114 is smaller than the diameter of the concentric edge 19 to allow embedment. In some examples, one of the first or second part includes a frame or crossmember and the other one of the first or second part includes a bracket, although other parts can be joined.

The second body portion 30 of the fastener 10 is partially inserted or pressed into the opening 116 in the first part 110. In some examples, a mandrel is used to press the fastener into the first part 110 without distorting the first part 110. The bolt 90 is inserted into the opening 118 in the second part 114 and the central bore 16 of the fastener 10. As the bolt 90 is tightened, the threads 98 engage the threads 40 of the fastener 10 to create embedment and clamping force.

The splines 32 engage sides of the opening 116 in the first part 110 to prevent rotation of the fastener 10 as the bolt 90 is tightened. As the bolt 90 is tightened further, the concentric edge 19 is embedded into the second part 114 by a predetermined distance to create high shear force and prevent lateral slipping. In some examples, the embedment of the concentric edge 19 requires less than 50% of the clamping force, although other values can be used. In other words, there is balance between embedment force and clamping force. This allows sufficient clamping force to remain to hold the parts together during use (typically involving vibration). In other words, if higher levels of clamping force are required for embedment, a loose joint may occur later due to vibration. In some examples, the concentric edge 19 is embedded into the first part by a predetermined distance in a range from 0.25 mm to 1 mm, although other values can be used. In some examples, the fastener is made of steel or other material that is harder than the first part and/or the second part.

Figure 8:
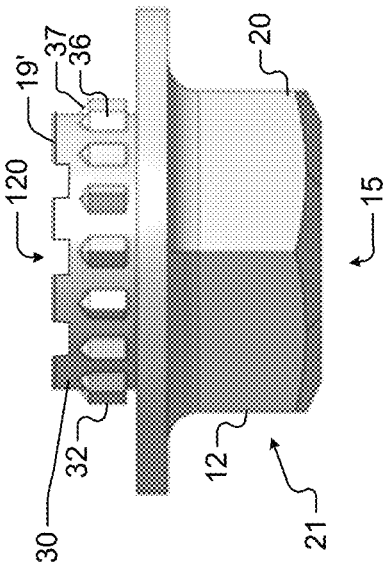
FIG. 8 is a side view of another example of the fastener of FIGS. 1-6 with a concentric edge including spaced notches according to the present disclosure.

Referring now to FIG. 8, a concentric edge 19' may include a plurality of notches 120 that are spaced apart by a predetermined distance. The number of notches and the spacing between the notches 120 can be determined based upon the amount of embedment that is desired. In some examples, the depth of the notches corresponds to the amount of embedment desired. The notches 120 can be used to modulate the balance between embedment and clamping force.

Referring now to FIGS. 9-12, another fastener 100 is shown and includes an inclined surface 210 that extends outwardly from a concentric edge 212 of the body 12 adjacent to the opening 14 (rather than inwardly as shown in FIGS. 1-6 above). The inclined surface 210 and the concentric edge 212 create a convex surface that embeds into the second part 114 to prevent lateral slipping. As can be appreciated, the opening 118 in the second part 114 has a smaller diameter as compared to the example in FIG. 1 due to the smaller diameter of the concentric edge 212. As can be appreciated, the radial width of the concentric edges can be varied to further modulate the balance between the embedment force and the clamping force.

Referring now to FIG. 13, a fastener 300 includes a first inclined plane 310 (forming a convex surface), a second inclined plane 312 (forming a concave surface) and a concentric edge 320 located between the first inclined plane 310 and the second inclined plane 312.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A fastener for attaching a first part and a second part, comprising:
   a body comprising a first body portion, a second body portion, a flange arranged between the first body portion and the second body portion and extending radially outwardly from the body;
   a bore extending in an axial direction through the body and including an inner surface with threads the bore including an opening at the second body portion defining a concentric edge, the concentric edge including a plurality of notches; and
   a plurality of splines extending radially outwardly from the second body portion and configured to prevent rotation when the second body portion is inserted into an opening in the first part.

2. The fastener of claim 1, wherein the concentric edge includes an inclined plane.

3. The fastener of claim 2, wherein the concentric edge and the inclined plane are configured to embed into the second part and prevent lateral slipping of the fastener relative to the second part.

4. The fastener of claim 2, wherein the concentric edge and the inclined plane define a concave surface.

5. The fastener of claim 2, wherein the concentric edge and the inclined plane define a convex surface.

6. The fastener of claim 2, wherein the concentric edge is configured to embed into the first part in a range from 0.25 mm to 1 mm.

7. The fastener of claim 1, wherein the notches have a depth in a range from 0.25 mm to 1 mm.

8. The fastener of claim 1, further comprising a tool engaging surface defined on a radially outer surface of the first body portion for engaging a tool.

9. The fastener of claim 1, wherein the plurality of splines have a triangular cylinder shape.

10. The fastener of claim 9, wherein the plurality of splines include a pointed end on one side of the triangular cylinder shape.

11. A fastener for attaching a first part and a second part, comprising:
    a body comprising a first body portion, a second body portion, a flange arranged between the first body portion and the second body portion and extending radially outwardly from the body;
    a bore extending in an axial direction through the body and including an inner surface with threads the bore including an opening at the second body portion defining a concentric edge, the concentric edge including a plurality of notches that are spaced apart; and
    a plurality of splines extending radially outwardly from the second body portion and configured to prevent rotation when the second body portion is inserted into an opening in the first part, wherein the opening to the bore at the second body portion defines a concentric edge and a first inclined plane extending from the concentric edge, and wherein the concentric edge is configured to embed into the first part in a range from 0.25 mm to 1 mm.

12. The fastener of claim 11, wherein the plurality of notches have a depth in a range from 0.25 mm to 1 mm.

13. The fastener of claim 11, further comprising a tool engaging surface defined on a radially outer surface of the first body portion for engaging a tool.

14. The fastener of claim 11, wherein the plurality of splines have a triangular cylinder shape.

15. The fastener of claim 14, wherein the plurality of splines include a pointed end on one side of the triangular cylinder shape.

16. The fastener of claim 11, wherein the first inclined plane extends one of radially inwardly and radially outwardly.

\* \* \* \* \*